United States Patent [19]

Schmall

[11] Patent Number: 4,677,275
[45] Date of Patent: Jun. 30, 1987

[54] METHOD AND SENSOR ARRANGEMENT FOR TOOL/WORKPIECE SPACING CONTROL IN ELECTRIC ARC PROCESSING MACHINES

[75] Inventor: karl-Heinz Schmall, Baden-Baden, Fed. Rep. of Germany

[73] Assignee: GET Gesellschaft fur Elektronik-Technologie mbH, Baden-Baden, Fed. Rep. of Germany

[21] Appl. No.: 820,799

[22] Filed: Jan. 22, 1986

[30] Foreign Application Priority Data

Jan. 31, 1985 [CH] Switzerland ............................ 426/85

[51] Int. Cl.$^4$ ............................................... B23K 9/12
[52] U.S. Cl. .............................. 219/124.03; 219/124.1
[58] Field of Search ....................... 219/124.02, 124.03, 219/124.1

[56] References Cited

U.S. PATENT DOCUMENTS

| | | | |
|---|---|---|---|
| 3,529,124 | 9/1970 | MacFarlane et al. | 219/124.03 |
| 3,809,308 | 5/1974 | Roeder et al. | 219/124.02 |
| 3,970,911 | 7/1976 | Schmall | 219/124.02 |

FOREIGN PATENT DOCUMENTS

| | | |
|---|---|---|
| 0007034 | 1/1980 | European Pat. Off. . |
| 0130940 | 1/1985 | European Pat. Off. . |
| 2747539 | 4/1979 | Fed. Rep. of Germany . |
| 2394783 | 1/1979 | France . |
| 2064135 | 6/1981 | United Kingdom . |
| 2067447 | 7/1981 | United Kingdom . |
| 2123993 | 2/1984 | United Kingdom . |

Primary Examiner—Clifford C. Shaw
Attorney, Agent, or Firm—William R. Hinds

[57] ABSTRACT

In a processing machine which operates with an arc, for example, a burning cutting installation, the arc current is measured and regulating signals are derived from the measurement value for the purposes of regulating the tool-workpiece spacing. In that procedure the analog measurement value is converted by a converter into high frequency signals whose frequency corresponds to the respective measurement value, the high frequency signals are fed to a regulator and therein are converted again into analog and/or digital signals. Also provided is a capacitive or inductive spacing measuring means which is also connected to the converter so that the arc current measurement values and the spacing values of the capacitive or inductive measuring arrangement are processed by the same converter means and evaluation circuit.

15 Claims, 6 Drawing Figures 4,677,275

METHOD AND SENSOR ARRANGEMENT FOR TOOL/WORKPIECE SPACING CONTROL IN ELECTRIC ARC PROCESSING MACHINES

FIELD OF THE INVENTION

The invention relates to a method of determining the spacing between the tool of a processing machine which operates with an electric arc, and a workpiece to be processed, wherein a first measuring means is provided for measuring the voltage at and/or the current in the arc and for generating electrical analog signals from the measured voltage or current values, which analog signals correspond to the length of the arc.

In most processing machines which operate with an electric arc, control or regulation of the length of the arc is a critical consideration in regard to the result obtained. Thus, for example, the quality of a weld seam which is produced by means of an electric welding machine is critically dependent on the length of the arc between the electrode and the workpiece. The same also applies in regard to burning cutting installations and other comparable processing machines or methods using an arc, which remove material or which apply material or which join material.

It is known that the arc in such machines is generated by virtue of a current, preferably a direct current with a high level of current strength, flowing between the tool and the workpiece. As soon as the arc is fired, it is possible for the length of the arc and therewith the working range to be controlled in the plasma, with a relatively large tolerance, even at relatively low d.c. voltages. Assuming a comparable tool (for example, welding electrode) and workpiece, in such a situation a given burning voltage or a given burning current correspond to the respective length of the arc. That item of knowledge has already been put to use in follow-up regulating arrangements for burning cutting installations, by virtue of the burning current and/or the voltage between the tool and the workpiece being measured and compared to a reference value, wherein, when deviations are detected, the spacing between the tool and the workpiece is varied until the reference value and the actual value are the same again. It is possible in that way to achieve a very precise control in regard to the spacing of the tool and the workpiece, and that is a major advantage in particular for the purposes of continuously regulating the spacing when dealing with workpieces having a corrugated or irregular surface. Such an installation is marketed, for example, by the company Messer Grieshelm, Frankfurt/Main, under the name LIBO-Regelung. That method is referred to as a processor-oriented sensor system.

DESCRIPTION OF PRIOR ART

In the state of the art, difficulties are caused in regard to regulating the tool-workpiece spacing when the tool moves towards the workpiece for the first time, that is to say, before the arc has fired and there is thus a measurement signal which can be evaluated. The same applies in regard to the situation that the arc is extinguished for example due to a fault during the processing or machining operation. The approach movement to the workpiece is generally referred to as first finding the spacing.

The problem of regulating or controlling the spacing in the automatic mode of first finding the spacing between the tool and the workpiece has hitherto been solved by using a separate regulating circuit in addition to the regulating arrangement which is dependent on the arc. The separate regulating circuit generally operates with an inductive or capacitive sensor, in the first-finding mode, in order continuously to measure the spacing between the workpiece and the tool until the reference spacing is attained. After the arc has fired, the sensor arrangement is switched off and removed from the direct area of operation of the tool by mechanical means.

A disadvantage of that method is that a complete sensor system is required only for the function of first finding the spacing between the tool and the workpiece, that sensor system being inactive during the working operation and causing a considerable increase in the overall costs of the installation. Furthermore, generating the regulating voltage from the voltage or the current of the arc is very expensive because of the insulation separation required. In addition, inaccuracies in the regulating action can occur by virtue of the fact that the measurement signals which correspond to the length of the arc and which are detected in terms of d.c. voltage and which are transmitted to a regulating and evaluating arrangement may be influenced and falsified by electrical interference on the conduction path.

SUMMARY OF THE INVENTION

The invention is based on the problem of avoiding the disadvantges of the known system and in particular therefore providing an improved sensor arrangement and an improved method of the kind set forth in the opening part of this specification, which also provides for an economically advantageous and reliable system, by virtue of a particularly effective combination of the sensors.

In accordance with the invention, that is primarily solved in that, in a measuring means for measuring the voltage or the current in the arc, firstly the analog signals corresponding to the length of the arc are converted into high frequency signals, that the high frequency signals are fed by means of a transmission arrangement, in particular a conduit, to the regulator, there they are applied to a transducer for fresh conversion into analog and/or digital signals, and that the output signals of the second transducer are passed to a display and/or a regulating arrangement for regulating the spacing of the tool from the workpiece or for regulating the length of the arc.

Surprisingly, that achieves two major advantages, without a high level of component expediture: by virtue of conversion of the d.c. signals which are dependent on the length of the arc, into frequency signals, it is possible for conventional LC-sensor arrangements as are used for example in capacitive or inductive measuring arrangements for first finding the tool-workpiece spacing, also to be used for regulating purposes in operation of the arc. In addition, the transmission of the measurement values between the sensor arrangement and the regulator by means of high frequency signals may be substantially less susceptible to interference than the transmission of analog signals. Therefore, the arrangement according to the invention is not only more universal and generally simpler in construction, but also more accurate and more resistant to interference.

In a sensor arrangement having a second measuring means for measuring the tool-workpiece spacing, with the arc switched off or not fully in a condition of operational readiness, by means of a capacitive or inductive sensor, the invention may be further improved if high frequency signals are applied to the sensor, wherein the sensor is also connected to the first transducer for converting the high frequency signals into analog and/or digital signals. Both the measurement value signals which are dependent on the arc and also the spacing-proportional signals which are derived from the capacitive or inductive sensor are therefore processed in that system in the same circuit arrangement. More specifically, while known measuring means in sensor arrangements have only one capacitive or inductive spacing sensor which is in the form of a frequency-varying component of an LC-circuit, generally an oscillator, in accordance with the invention, such a circuit includes a second frequency-varying component whose frequency characteristics are altered not by the spacing of a sensor from the workpiece but by those spacing-proportional signals which are obtained by the first measuring means from the voltage/current of the arc.

Conventional sensors and LC-circuits of the kind previously used are described for example in the present applicants' following German laid-open applications: DE-OS No. 27 26 648 (filing date: June 14, 1977), DE-OS No. 28 29 851 (filing date: July 7, 1978, DE-OS No. 27 47 539 (filing date: Oct. 22, 1977) and Swiss patent specification No. 641 989 (filing date: Dec. 20, 1979).

Accordingly it is left to the man skilled in the art to decide, in consideration of the specific area of use, whether the inductance or the capacitance of an LC-circuit is used as the frequency-varying component, that is to say therefore as the sensor. In this connection, circuit arrangements in which the LC-circuit is part of an oscillator have proved to be successful. It will be appreciated however that it is also possible for the LC-circuit to be formed as part of a band pass filter, and to derive suitable signals, at a constant frequency but with a different transmission characteristic in respect of the band pass filter which is then detunable. All those measures are conventional practice and known to the man skilled in the art.

The sensor arrangement according to the invention may be designed in practical terms in a particularly simple fashion if the second frequency-determining component is an inductance; the control circuit for varying the inductance may then advantageously be designed in such a way that the inductance is a coil with a high frequency core, which is incorporated as part thereof into a magnetic circuit, that at least a second further coil is provided in the magnetic circuit, the output signals, which are proportional to the length of the arc, of the first measuring means being applied to the second coil in such a way that the inductance of the frequency-determining coil is variable by bias magnetisation of the magnetic circuit by means of the direct current signals flowing through the second coil. In that arrangement, the working point of the magnetic circuit may be preset as desired by suitable presetting of the bias magnetisation coil, whereby the characteristic of the variation in inductance and thus the regulating charactersitic of the entire circuit can be adjusted.

As the second frequency-determining component, it is also advantageously possible to use a capacitance diode whose capacitance can be varied by the direct current signals which are proportional to the length of the arc. The high level of dielectric strength required between the electric arc current source and the high frequency circuit may be achieved in a very simple manner and with passive components, by means of the above-indicated arrangement, because the two magnetic circuit coils are separated in respect of space and are not galvanically connected together.

The sensor arrangement may be used in a particularly advantageous manner in such a way that the respective spacing is regulated by the measurement signals which are proportional to the length of the arc, in a fully automatic manner and without a separate change-over switching operation, if and as long as the arc is burning, but that the arrangement is automatically switched over to spacing regulation by an inductive or capacitive sensor when the arc is not burning. That may be achieved in a particularly advantageous fashion by the second frequency-influencing component and the control circuit for operating same being of such dimensions that, when the arc is cut in, the frequency of the LC-circuit differs so substantially from the working frequency which is set by the first frequency-determining component, that the frequency operating ranges set by the two frequency-influencing components can be determined by frequency-selective components, in particular band pass filters. Particularly good signal separation may be achieved in that arrangement when the frequency operating range of the one frequency-determining component differs at least by a factor of 1.5 from the frequency working range of the other frequency-determining component.

Superimposition of the output signals of the two frequency-determining components is prevented in a particularly advantageous manner if there is provided a switching means which separates the first frequency-determining component from the LC-member and/or the oscillator input as soon as the second frequency-determining component is shifted from its frequency rest range into its frequency working range after firing of the arc by the signals which are dependent on the length of the arc.

It will be apparent that inventive step is ensured in the subject-matter of this application both by virtue of the novel individual features and also in particular by virtue of combination and sub-combination of the features employed.

DESCRIPTION OF THE DRAWINGS

The invention is described in greater detail hereinafter in embodiments, with reference to the drawings, in which.

DESCRIPTION OF PREFERRED EMBODIMENTS

Figure 1:
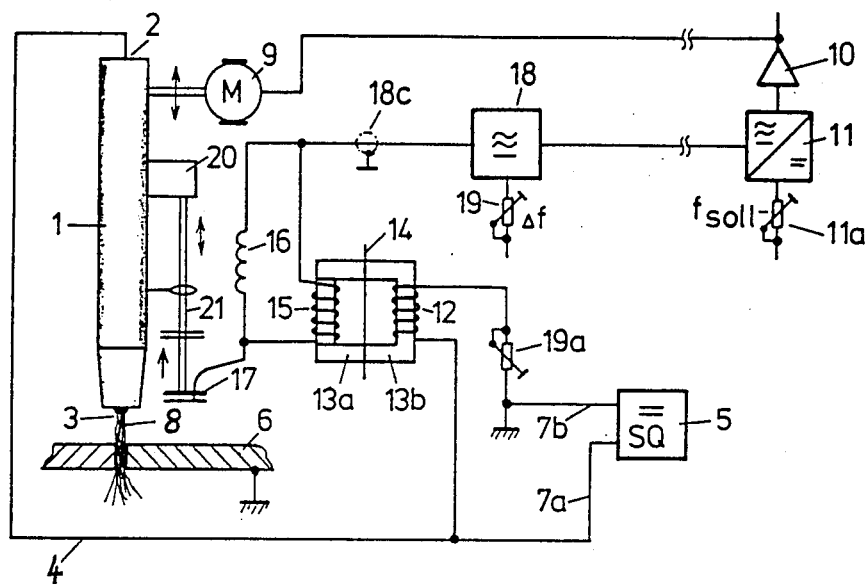
FIG. 1 shows a sensor arrangement having the features of the invention.

Referring to FIG. 1, provided as a tool 1 of an automatic welding machine is an electrode holder 2 in which there is disposed an electrode 3 which is connected by way of a conduit 4 to the first output 7a of a welding current source 5. A second output 7b of the welding current source 5 is connected to earth, and likewise a workpiece 6 which is a steel plate that is to be cut. The electrode holder 2 can be displaced in respect of height by means of a motor 9 whereby the spacing between the electrode 3 and the workpiece 6 and thus the length of the arc 8 may be regulated. The motor 9 is operated by a regulating amplifier 10 which receives regulating signals from a discriminator 11.

Figure 6:
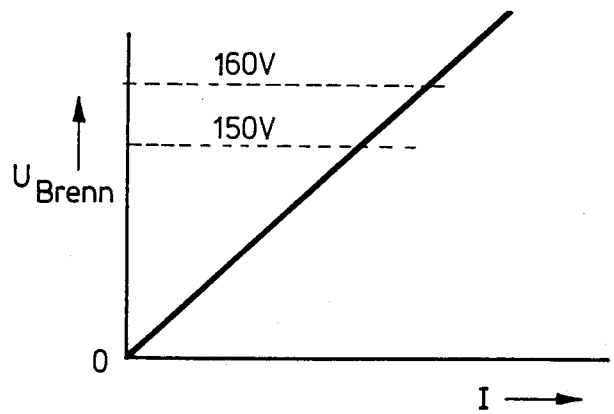
FIG. 6 shows the voltage characteristic at the arc or the arc current source.

Depending on the respective length of the arc 8, the voltage between the two outputs 7a and 7b of the welding current source 5 varies in a working range of between about 150 volts and 160 volts, as can be seen from FIG. 6. That voltage is applied to a bias magnetisation coil 12 which is part of a magnetic circuit consisting of two ferrite cores 13a and 13b. Disposed between the ferrite cores 13a and 13b is a plate 14 of insulating material, which provides for reliable separation of the high voltage of the welding current source 5 from the regulating circuit described hereinafter. In conventional regulating installations, such a separation effect is achieved only by means of expensive separation amplifiers and other measures, while in the arrangement according to the invention it is a self-evident element, which is simple to provide, of the magnetic circuit 13a and 13b. Wound around the ferrite core 13a is a coil 15 which is connected in parallel with a coil 16. The coil 16 is also connected to a capacitive sensor 17 so that the coils 15 and 16, together with the capacitive sensor 17, form an LC-circuit. The capacitance of the capacitive sensor 17 is dependent on the spacing thereof from the workpiece 6. The LC-circuit 15, 16 and 17 is connected to the input of an oscillator 18 and determines the oscillation circuit thereof. The oscillator 18 also has a setting resistor 19 which permits frequency preselection. The setting resistor 19 permits preselection in respect of frequency and thus the spacing of the tool and the electrode, in operation of the arc.

Figure 4:
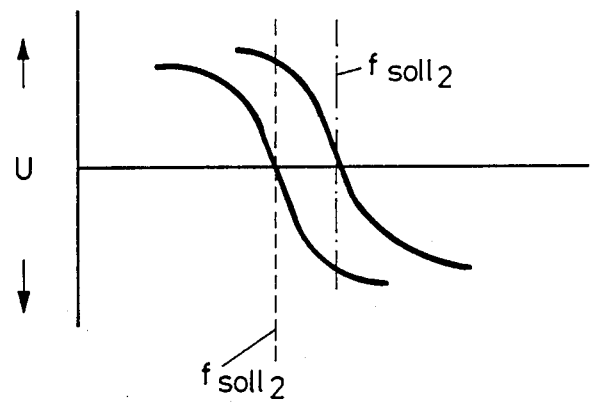
FIG. 4 is a diagrammatically illustrated curve configuration at the discriminator which is provided in the sensor arrangement.

In a practical situation, the sensor arrangement shown in FIG. 1 operates in the following manner: for starting up, that is to say, prior to firing of the arc 8, the electrode holder 2 is moved by the motor 9 to a position over the workpiece 6. A change in spacing between the tool 1 and the workpiece 6 results in a change in the sensor capacity 17 and thus a variation in the oscillator frequency at 18. The HF-signal supplied by the oscillator 18 to the discriminator 11 is converted by the latter into direct current signals. If the capacitance sensor 17 is at the desired or reference spacing relative to the workpiece 6, the output frequency at the oscillator 18 corresponds to the reference frequency so that no voltage occurs at the output of the discriminator 11. The motor 9 is therefore stopped (see FIG. 4). If on the other hand the spacing of the tool 1 and the capacitive sensor 17 from the workpiece 6 is too great, the capacitance drops, the oscillator frequency rises, and a negative signal appears at the output of the discriminator 11; that negative signal is amplified by th regulating amplifier 10 and actuates the motor 9 in such a way that the tool 1 is again moved towards the workpiece 6. When that occurs the capacitance of the capacitive sensor 17 rises again, the frequency of the oscillator 18 slowly approaches the reference frequency, and the output signal at the discriminator 11 and at the regulating amplifier 10 drops to zero as soon as the reference value is reached again. The reference frequency and therewith the tool spacing may be set by a setting resistor 11a at the discriminator 11. In addition the oscillator frequency and therewith the spacing between the tool 1 and the workpiece 6 may be adjusted manually by the resistor 19 at the oscillator 18 being adjusted.

If in the course of operation the arc 8 has fired, the voltage occurs at the bias magnetisation coil 12. The magnetic circuit 13a and 13b is brought into the separate core line region of the HF-core, whereby the inductance of the coil 15 falls. A holder 21 of the capacitive sensor 17 may be raised by means of a lifting arrangement 20 which can be electromechanically triggered, so that the capacitive sensor 17 is moved to a position at such a spacing from the workpiece 6 that variations in the tool-workpiece spacing at 1, 6 no longer give rise to a disturbing variation in capacitance. Variations in frequency of the LC-circuit are thereafter produced exclusively by variations in inductance of the coil 15. Any variation in the length of the arc 8 results in a variation in the welding current and thus a change in voltage across the outputs 7a and 7b of the welding current source 5. That in turn alters the flow of current through the coil 12 and affects the inductance of the coil 15 whereby, in a similar fashion as in the case of the above-described changes in capacitance of the capacitive filter 17, the frequency of the ocillator 18 is altered, which in turn gives rise to spacing-proportional signals at the output of the discriminator 11. Conversion of the fluctuations in voltage at the outputs 7a and 7b of the welding current source 5 into frequency signals by means of the coils 12 and 15, the LC-arrangement 16, 17 and the oscillator 18 is particularly advantageous for the reason that transmission of the spacing-dependent signals to the discriminator 11 by way of a line, as a result thereof, remains unaffected by interference voltages and induction phenomena, as are frequently to be observed in particular in such welding installations. The discriminator 11 produces its output signals exclusively in response to fluctuations in frequency and is unaffected by fluctuations in voltage on the transmission conduit.

In addition conversion of the fluctuations in voltage at the output 7a and 7b of the welding current source 5 makes it possible to use a common evaluation circuit (oscillator 18, discriminator 11 and regulating amplifier 10) both for the purposes of regulation by means of the capacitive sensor 17 and also for the purposes of regulation in dependence on the length of the arc 8 or the arc voltage.

Figure 2:
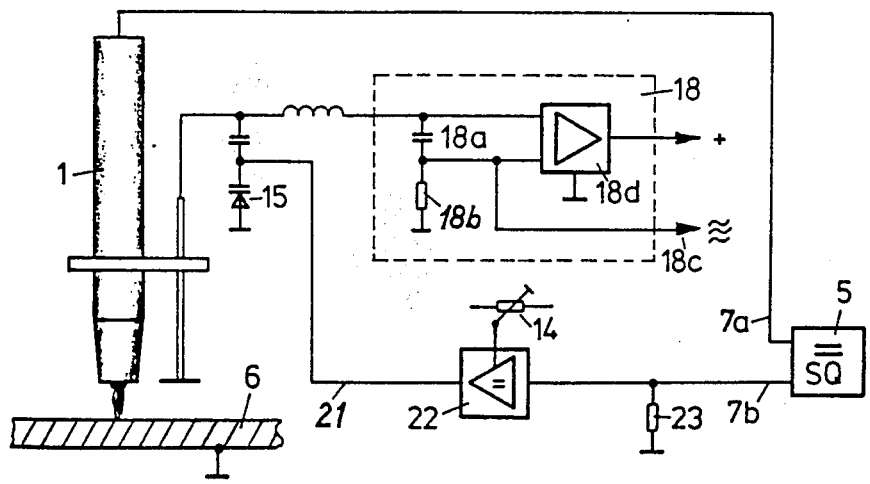
FIG. 2 shows a modified embodiment with a capacitance diode as the second frequency-determining component.

In the embodiment shown in FIG. 2, the same components are denoted by the same reference numerals. In that arrangement, the oscillator 18 is shown in greater detail and illustrates the capacitor 18a, the amplifier 18d, the output resistor 18b and the voltage output 18c.

Unlike the embodiment shown in FIG. 1, a capacitance diode 15 is connected in parallel with the variable capacitance of the capacitive sensor 17. It will be seen that the diode 15 is a frequency-determining component in the LC-circuit 16, 15, 17. The capacitance of the diode 15 is variable by a voltage which is taken by way of a line 21 from a voltage amplifier 22 which is provided with a setting resistor 14 for the purposes of gain adjustment. The amplifier 22 is connected to a series resistor 23 through which the welding current flows. The proportional voltage drop at the resistor 23 is amplified in the amplifier 22 so that the capacitance of the diode 15 is controlled by the welding current. An increase in voltage reduces the capacitance of the diode 15 and thus causes a corresponding change in the frequency of the oscillator 18 which in turn produces an output signal at the discriminator 11 and thus a follow-up control signal for the motor 9, in the manner described hereinbefore.

Figure 3:
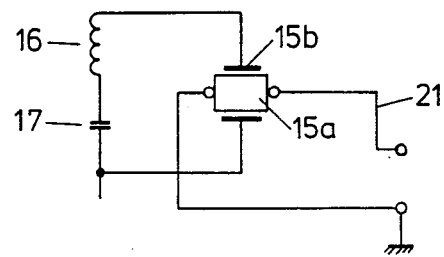
FIG. 3 shows a modified embodiment with a piezoelectric element as the frequency-determining component.

FIG. 3 shows an embodiment which is similar to that shown in FIG. 2, but in which, instead of the capcitance diode 15, the arrangement has a piezoelectric element 15a which is provided on both sides with capcitor plates 15b. The piezoelectric element 15a is connected on the other hand by way of the line 21 to the voltage divider 14, 22 (see FIG. 2). Any variation in the d.c. voltage at the line 21 causes a geometric variation in the piezoelectric element 15a, which alters the spacing of the electrode 15b and thus the capacitance of the arrangement. In the above-described manner, that in turn results in a variation in the frequency of the LC-member 15b, 17, 16 and therewith an oscillator detuning effect.

Figure 5:
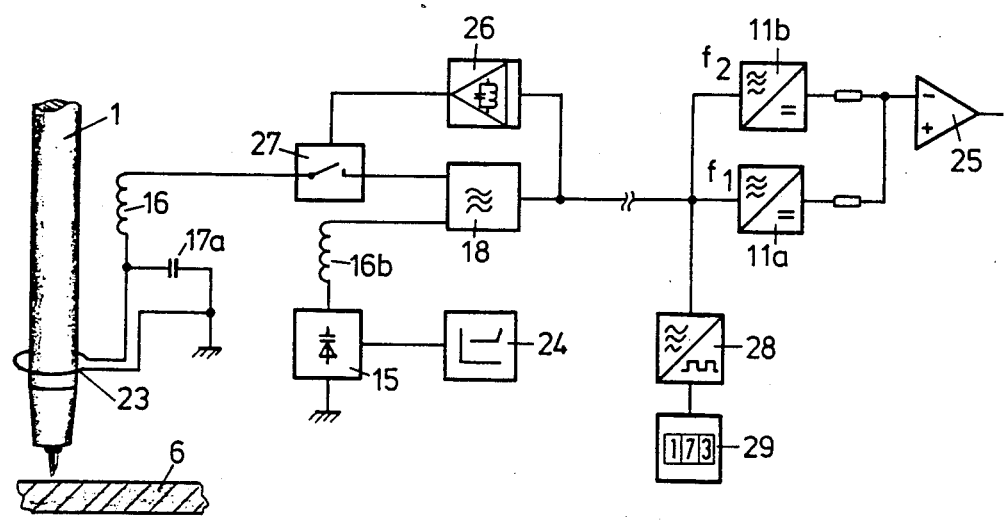
FIG. 5 shows an embodiment with automatic cutting out of the sensor when the measurement signals which are dependent on the arc occur.

In the embodiment shown in FIG. 5, a sensor arrangement with an inductive sensor 23 is illustrated in diagrammatic form. The inductance of the inductive sensor 23 is altered by an approach movement towards the workpiece 6 so that the frequency characteristic of the LC-member 23, 17a and 16 is altered thereby changing the output frequency of the oscillator 18. A second LC-member consisting of a coil 16b and a capacitance diode 15 is also connected to the oscillator. The two LC-circuits which are disposed in parallel are tuned in that arrangement in such a way that the oscillator 18 oscillates in a frequency range F1 as long as no d.c. voltage signal which corresponds to the fired arc arrives by way of the line 21. That is achieved by means of a threshold member 24 which suppresses signals which occur with the arc 8 in the unfired condition. The oscillator which oscillates in the frequency range F1 is detuned in known manner by the inductive sensor 23, the changes in frequency being evaluated in the discriminator 11a which is tuned to the frequency F1. The output signal of the discriminator 11a is applied to the input of a summing amplifier 25 which is connected to a regulating amplifier 10 (see FIG. 1). The spacing regulating effect which is produced by means of the sensor 23 is produced in the above-described manner as long as the arc 8 has not fired. As soon as the arc 8 has fired, a higher d.c. voltage signal occurs at the input of the threshold member 24 which transmits same so that it puts the capacitance diode 15 into its working range. The capacitance of the diode 15 alters greatly, and the oscillator 18 is detuned out of the frequency range F1. Connected to the output of the oscillator 18 is a frequency-selective amplifier 26 which is tuned to that altered frequency and whose output signal operates a gate member 27 which separates the coil 16, the capcitance 17a and the inductive sensor 23 from the input of the oscillator 18. The oscillator 18 now oscillates in a frequency range F2, the frequency-varying component being formed by the capacitance diode 15 whose capacitance depends on the arc voltage and thus the length of the arc 8 (not shown). The signals in the frequency range F2 are converted into direct current signals by the discriminator 11b and applied to the second input of the summing amplifier 25. In that way regulation of the spacing of the tool 1 from the workpiece 6 occurs exclusively by virtue of measurement of the arc voltage or the arc current as long as the arc is in existence and correspondingly the input voltage applied to the threshold member 24 is above the blocking range thereof. If however in the course of operation the arc goes out due to a fault or is cut out by way of the workpiece, the voltage at the threshold member 24 falls, the capcitance diode 15 changes in its capacitance to such a substantial degree that the oscillator frequency is detuned out of the frequency range F2, the frequency-selective amplifier 26 no longer supplies an output signal to the gate circuit 27, the gate circuit 27 closes again and thus the sensor arrangement is reset again to the frequency range F1 in which the variation in frequency and regulation of the tool-workpiece spacing are produced exclusively by means of the inductive sensor 23. That therefore provides a fail-safe regulating effect in an extremely simple manner.

It will be appreciated that the above-indicated mode of operation may also be provided by means of a current- and/or voltage-controlled variable inductance, as described in FIG. 1.

Provided in parallel with the discriminators 11a and 11b is an HF-digital converter 28 which converts the output signals of the oscillator 18 into proportional digital signals which are fed to a digital display means 29; in that way, displayed therein is the respective frequency value or the respective tool-workpiece spacing. It will be appreciated that it would also be possible for not only the display means but also the motor regulating means to be operated by the digital output of the HF-digital converter 28, instead of in an analog mode, by way of the discriminators 11a and 11b.

We claim:

1. A method of determining the spacing between a tool of a processing machine which operates with an electric arc and a workpiece processed by the arc, the method comprising measuring an electrical parameter determined by the length of the arc, generating electrical analog signals from said parameter, transducing said analog signals into high frequency signals, transmitting said high frequency signals to a regulator, further transducing in said regulator said high frequency signals to output signals for regulating the spacing between said tool from said workpiece and consequently regulating the length of said arc, and feeding said output signals to an arrangement enabling said spacing to be controlled.

2. A method according to claim 1, further comprising applying high frequency signals to a sensor in means responsive to the spacing between said tool and said workpiece prior to and during ignition of the arc, transducing said high frequency signals as modified by said sensor to output signals and feeding said output signals to said arangement enabling said spacing to be controlled.

3. A sensor arrangement for determining the spacing between a tool of a processing machine which operates with an electric arc and a workpiece to be processed, the arrangement including means for adjustably positioning a tool with respect to a workpiece, means for maintaining an electric arc current between said tool and said workpiece, an electric circuit for the conversion of changes in frequency into changes in voltage, said circuit including at least one variable, frequency-determining component, means for applying signals directly proportional to said arc current to said frequency-determining component to vary the frequency appropriately, and connecting means between said electric circuit and said adjustably positioning means enabling the position of said tool to be controlled.

4. A sensor arrangement for determining the spacing between a tool of a processing machine which operates with an electric arc and a workpiece to be processed, the arrangement including means for adjustably positioning a tool with respect to a workpiece, means for maintaining an electric arc current between said tool and said workpiece, first measuring means including an electric circuit for conversion of changes in frequency into changes in voltage, said circuit including at least one variable, frequency-determining component, means for applying signals directly proportional to said arc current to said frequency-determining component to vary the frequency appropriately, said electric circuit being connected to said adjustably positioning means for controlling the position of said tool, and second measuring means for measuring the spacing between said tool and said workpiece prior to full operational readiness of said arc, said second measuring means including an LC-circuit comprising a sensor which is formed as a first frequency-varying component for said frequency-determining component of said first measuring means in response to the position of said tool with respect to said workpiece, said second measuring means including also a second frequency-varying component for said frequency-determining component, and a control circuit responsive to said signals for said first measuring means connected to said second frequency-varying component for varying the frequency characteristics thereof.

5. A sensor arrangement according to claim 4, in which said second frequency-varying component is an inductance and said control circuit is arranged to vary said inductance.

6. A sensor arrangement according to claim 5, including an electromagnetic circuit having a core with a high degree of permeability wound by a first coil constituting said inductance and a second winding forming part of said control circuit whereby the magnetic field of said electromagnet is variable by direct current signals flowing through said second coil according to the length of said arc.

7. A sensor arrangement according to claim 4, in which said second frequency-varying component is a capacitor arranged for its capcitance to be variable by direct current signals and forming part of said control circuit whereby said capacitance is variable by signals proportional to the length of said arc.

8. A sensor arrangement according to claim 7, in which said capacitor is a variable capcitance diode.

9. A sensor arrangement according to claim 7, in which said capacitor comprises a piezoelectric element and two capacitor plates respectively disposed on oppositely located surfaces of said piezoelectric element, and means connecting said plates into said control circuit whereby the spacing of said plates is variable according to voltage-signals dependent on the length of said arc.

10. A sensor arrangement according to claim 4, comprising an oscillator including said LC-circuit and having a frequency of oscillation which is variable either by said first frequency-varying component or by said second frequency-varying component.

11. A sensor arrangement according to claim 10, in which said oscillator is a clapp oscillator.

12. A sensor arrangement according to claim 4, in which said second frequency-varying component and said control circuit for actuating said second frequency-component have such characteristics that when said arc is struck, the frequency of said LC-circuit differs substantially from said first frequency-varying component, the sensor arrangement including also frequency-selective means for determining and separating frequency working ranges set respectively by said first and second frequency-varying components.

13. A sensor arrangement according to claim 12, in which the frequency working range of one of said first and second frequency-varying components differs by a factor of 1.5 from the frequency working range of the other of said first and second frequency-varying components.

14. A sensor arrangement according to claim 12, in which said frequency-selective means comprise switching means operative to separate said first frequency-varying component from said LC-circuit as soon as said second frequency-varying component is set to its frequency working range by the action of said control circuit when said arc is struck, said last-mentioned range including signals dependent of the length of said arc.

15. A sensor arrangement for determining the spacing between a tool of a processing machine which operates with an electric arc and a workpiece to be processed, the arrangement including means for adjustably positioning a tool with respect to a workpiece, means for maintaining an electric arc current between said tool and said workpiece, a sensor operative in a contactless mode for measuring the position of said tool relatively to said workpiece, means for signalling the position of said tool as determined by said sensor, a second measuring means for measuring the arc current and hence the arc length when said arc is struck and signalling the length of said arc, and signal responsive means for actuating said means for adjustably positioning said tool in response to and in accordance with tool position signals and arc length signals from said sensor and from said second measuring means.

* * * * *